(12) United States Patent
Shibuya

(10) Patent No.: US 10,726,825 B2
(45) Date of Patent: Jul. 28, 2020

(54) INFORMATION PROCESSING APPARATUS, INFORMATION PROCESSING METHOD, AND PROGRAM

(71) Applicant: SONY CORPORATION, Tokyo (JP)

(72) Inventor: Hirohisa Shibuya, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/753,071

(22) PCT Filed: Jul. 13, 2016

(86) PCT No.: PCT/JP2016/070724
§ 371 (c)(1),
(2) Date: Feb. 15, 2018

(87) PCT Pub. No.: WO2017/038260
PCT Pub. Date: Mar. 9, 2017

(65) Prior Publication Data
US 2018/0240453 A1      Aug. 23, 2018

(30) Foreign Application Priority Data
Aug. 28, 2015   (JP) ................. 2015-168538

(51) Int. Cl.
*G10K 11/178*    (2006.01)
*H04R 3/00*      (2006.01)
(Continued)

(52) U.S. Cl.
CPC .... *G10K 11/17885* (2018.01); *G06K 9/00335* (2013.01); *G10K 11/178* (2013.01); *H04R 3/00* (2013.01); *H04R 3/04* (2013.01)

(58) Field of Classification Search
None
See application file for complete search history.

(56) References Cited

U.S. PATENT DOCUMENTS 9,432,768 B1 *   8/2016   O'Neill .................. H04R 3/005
2005/0126370 A1  6/2005   Takai
(Continued)

FOREIGN PATENT DOCUMENTS

CN    2932502      8/2007
CN    103581803    2/2014
(Continued)

OTHER PUBLICATIONS

International Search Report prepared by the Japan Patent Office dated Sep. 16, 2016, for International Application No. PCT/JP2016/070724.
(Continued)

*Primary Examiner* — Kenny H Truong
(74) *Attorney, Agent, or Firm* — Sheridan Ross P.C.

(57) ABSTRACT

An information processing apparatus, an information processing method, and a program, which make it possible for a user to listen to an audio signal more appropriately are provided. An information processing apparatus, including: behavior recognition unit configured to recognize behavior of a user on a basis of sensing information of at least one of the user and an environment; a processing controller configured to control, on a basis of the recognized behavior of the user, signal processing with respect to at least one of an audio signal listened to by the user, a noise reduction signal, and an external sound monitor signal; and a signal processing unit configured to execute the signal processing.

16 Claims, 12 Drawing Sheets

(51) Int. Cl.
*G06K 9/00* (2006.01)
*H04R 3/04* (2006.01)

(56) References Cited

U.S. PATENT DOCUMENTS

| | | | | |
|---|---|---|---|---|
| 2010/0189293 | A1* | 7/2010 | Imamura | H04R 25/558 381/317 |
| 2012/0063611 | A1 | 3/2012 | Kimura | |
| 2012/0288116 | A1 | 11/2012 | Saito | |
| 2013/0259254 | A1* | 10/2013 | Xiang | G10K 11/175 381/73.1 |
| 2013/0278501 | A1* | 10/2013 | Bulzacki | G06F 3/017 345/157 |
| 2013/0332410 | A1* | 12/2013 | Asano | G06F 17/30345 707/609 |
| 2014/0307888 | A1* | 10/2014 | Alderson | H04R 3/002 381/71.8 |
| 2015/0172831 | A1 | 6/2015 | Dittberner | |
| 2015/0294662 | A1* | 10/2015 | Ibrahim | G10K 11/17885 381/71.6 |
| 2016/0267898 | A1* | 9/2016 | Terlizzi | H04R 1/1091 |
| 2019/0122689 | A1* | 4/2019 | Jain | G06N 3/08 |

FOREIGN PATENT DOCUMENTS

| | | |
|---|---|---|
| EP | 1533784 | 5/2005 |
| JP | 2005-156641 | 6/2005 |
| JP | 2008-122729 | 5/2008 |
| JP | 5194434 | 5/2008 |
| JP | 5034730 | 1/2009 |
| JP | 2012-063483 | 3/2012 |
| JP | 2012-239017 | 12/2012 |
| JP | 2015-130659 | 7/2015 |

OTHER PUBLICATIONS

Extended European Search Report for European Patent Application No. 16841292.2, dated Jun. 17, 2019, 6 pages.
Official Action (with English translation) for Chinese Patent Application No. 201680047015.0, dated Dec. 19, 2019, 27 pages.
Official Action (no English translation available) for Japanese Patent Application No. 2017-537630, dated Mar. 3, 2020, 6 pages.

* cited by examiner

INFORMATION PROCESSING APPARATUS, INFORMATION PROCESSING METHOD, AND PROGRAM

CROSS REFERENCE TO RELATED APPLICATIONS

This application is a national stage application under 35 U.S.C. 371 and claims the benefit of PCT Application No. PCT/JP2016/070724 having an international filing date of 13 Jul. 2016, which designated the United States, which PCT application claimed the benefit of Japan Patent Application No. 2015-168538 filed 28 Aug. 2015, the disclosures of each of which are incorporated herein by reference.

TECHNICAL FIELD

The present disclosure relates to an information processing apparatus, an information processing method, and a program.

BACKGROUND ART

With widespread of portable audio players, in order to obtain satisfactory playback sound field space at the outdoors, noise reduction systems have recently been spread which can reduce noise of an external environment.

As such a noise reduction system, systems disclosed in the following Patent Literatures 1 to 3 are proposed, for example.

To be specific, the following Patent Literature 1 discloses a noise reduction system which reduces a noise component included in a frequency band having frequencies less than or equal to a specific value. Further, the following Patent Literature 2 discloses a noise reduction system which generates a noise reduction signal using noise collected by a microphone provided in an inner part of a housing worn by a user on his/her ear and noise collected by a microphone provided in an outer part of the housing.

Further, studies have been conducted on generating a more appropriate noise reduction signal in response to noise of an external environment. For example, the following Patent Literature 3 discloses that a noise reduction signal is generated by analyzing characteristics of collected noise and using a filter coefficient selected on the basis of the analyzed noise characteristics.

CITATION LIST

Patent Literature

Patent Literature 1: JP 5034730B
Patent Literature 2: JP 5194434B
Patent Literature 3: JP 2008-122729A

DISCLOSURE OF INVENTION

Technical Problem

However, the techniques disclosed in the above Patent Literatures 1 to 3 have not been techniques that performs appropriate signal processing with respect to at least one of an audio signal, a noise reduction signal, and an external sound monitor signal in response to behaviors and situations of a user at the time at which the user listens to a sound.

Accordingly, the present disclosure proposes an information processing apparatus, an information processing method, and a program, which are novel and improved, and which make it possible for a user to listen to an audio signal more appropriately.

Solution to Problem

According to the present disclosure, there is provided an information processing apparatus, including: a behavior recognition unit configured to recognize behavior of a user on a basis of sensing information of at least one of the user and an environment; a processing controller configured to control, on a basis of the recognized behavior of the user, signal processing with respect to at least one of an audio signal listened to by the user, a noise reduction signal, and an external sound monitor signal; and a signal processing unit configured to execute the signal processing.

Further, according to the present disclosure, there is provided an information processing method, including: recognizing behavior of a user on a basis of sensing information of at least one of the user and an environment; controlling, by an arithmetic processing unit, on a basis of the recognized behavior of the user, signal processing with respect to at least one of an audio signal listened to by the user, a noise reduction signal, and an external sound monitor signal; and executing the signal processing.

Still further, according to the present disclosure, there is provided a program for causing a computer to function as a behavior recognition unit configured to recognize behavior of a user on a basis of sensing information of at least one of the user and an environment, a processing controller configured to control, on a basis of the recognized behavior of the user, signal processing with respect to at least one of an audio signal listened to by the user, a noise reduction signal, and an external sound monitor signal, and a signal processing unit configured to execute the signal processing.

According to the present disclosure, it is possible to control signal processing with respect to at least one of an audio signal, a noise reduction signal, and an external sound monitor signal by recognizing behavior of a user and using the recognized behavior as a basis.

Advantageous Effects of Invention

As described above, according to the present disclosure, a user is capable of listening to an audio signal more appropriately.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
FIG. 1 is an explanatory diagram illustrating a usage example of an information processing apparatus according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. First Embodiment
1.1. Overview of information processing apparatus
1.2. Configuration of information processing apparatus
1.3. Operation of information processing apparatus
1.4. Modified example of information processing apparatus
2. Second Embodiment
2.1. Configuration of information processing apparatus
2.2. Operation of information processing apparatus
3. Third Embodiment
3.1. Configuration of information processing apparatus
4. Conclusion

1. First Embodiment

[1.1. Overview of Information Processing Apparatus]

First, with reference to FIG. 1, an information processing apparatus according to a first embodiment of the present disclosure will be described. FIG. 1 is an explanatory diagram illustrating a usage example of an information processing apparatus 1 according to the present embodiment.

As shown in FIG. 1, the information processing apparatus 1 according to the present embodiment is an audio player that generates an audio signal, for example. The information processing apparatus 1 recognizes behavior of a user on the basis of sensing information of at least one of the user 3 and an environment measured by various sensors, and controls, on the basis of the recognized behavior of the user 3, generation of at least one of an audio signal listened to by the user 3, a noise reduction signal, and an external sound monitor signal. Note that, as shown in FIG. 1, for example, the audio signal generated by the information processing apparatus 1 may be listened to by the user 3 through an acoustic device 2 such as a connected headphone, or the like.

To be specific, the information processing apparatus 1 may generate, on the basis of the recognized behavior of the user 3, and on the basis of a sound collected in an external environment, the noise reduction signal that reduces a sound of an external environment listened to by the user 3 or an external monitor signal for the user 3 to confirm a sound of an external environment. The external monitor signal may be listened to by the user 3 alone, or may be listened to by the user 3 by being superimposed on audio content.

Further, the information processing apparatus 1 may control, on the basis of the recognized behavior of the user 3, acoustic processing to be performed on an audio signal of audio content (hereinafter, may be simply referred to as a content signal). Moreover, the information processing apparatus 1 may control, on the basis of the recognized behavior of the user, amplification processing to be performed on a content signal. Accordingly, the information processing apparatus 1 can cause the user to listen to a sound on which signal processing corresponding to the behavior of the user has been performed.

As shown in FIG. 1, the information processing apparatus 1 may be an audio player that is provided with various sensors capable of measuring sensing information of at least one of the user 3 and the environment, and may also be a smartphone, a wearable terminal, or the like. Further, the information processing apparatus 1 may also be, for example, an acoustic device such as a headphone or a pair of earphones that is provided with a sounding body such as a speaker. In addition, the information processing apparatus 1 may also be an information processing server that receives sensing information of at least one of the user 3 and the environment through a communication network and transmits an audio signal on which signal processing has been performed through the network to the acoustic device 2.

Note that the various sensors include, for example, an acceleration sensor, a gyro sensor, a geomagnetic sensor, a barometric sensor, a temperature sensor, a light intensity sensor, a pulse wave sensor, a global navigation satellite system (GNSS) sensor, a microphone, and the like. Those various sensors may be provided to the information processing apparatus 1, or may be provided to a device outside the information processing apparatus 1. In the case where the various sensors are provided to a device outside the information processing apparatus 1, the information processing apparatus 1 acquires sensing information through a communication interface or an external input interface.

The information processing apparatus 1 can recognize various activities of the user 3 using the sensing information of at least one of the user 3 and the environment measured by those various sensors. Note that it is preferred that a behavior recognition algorithm using machine learning be used for the behavior recognition of the user 3 performed by the information processing apparatus 1. Examples of activities of the user 3 recognized by the information processing apparatus 1 include the activities shown in the following Table 1. Further, the information processing apparatus 1 can also recognize, in addition to such activities of the user 3, whether the user 3 is holding the information processing apparatus 1 in his/her hand and whether the user 3 is operating the information processing apparatus 1 by his/her hand.

TABLE 1

| | |
|---|---|
| Stop | Riding bicycle |
| Walking | Riding motorcycle |
| Running | Riding in car |
| Skiing | Riding in bus |
| Snowboarding | Riding in train |
| Climbing up stairs | Riding on escalator |
| Climbing down stairs | Riding in elevator |

With such an information processing apparatus 1, appropriate signal processing can be performed with respect to at least one of the audio signal, the noise reduction signal, and the external sound monitor signal, depending on behaviors, situations, use cases, or the like of the user 3.

[1.2. Configuration of Information Processing Apparatus]

Figure 2:
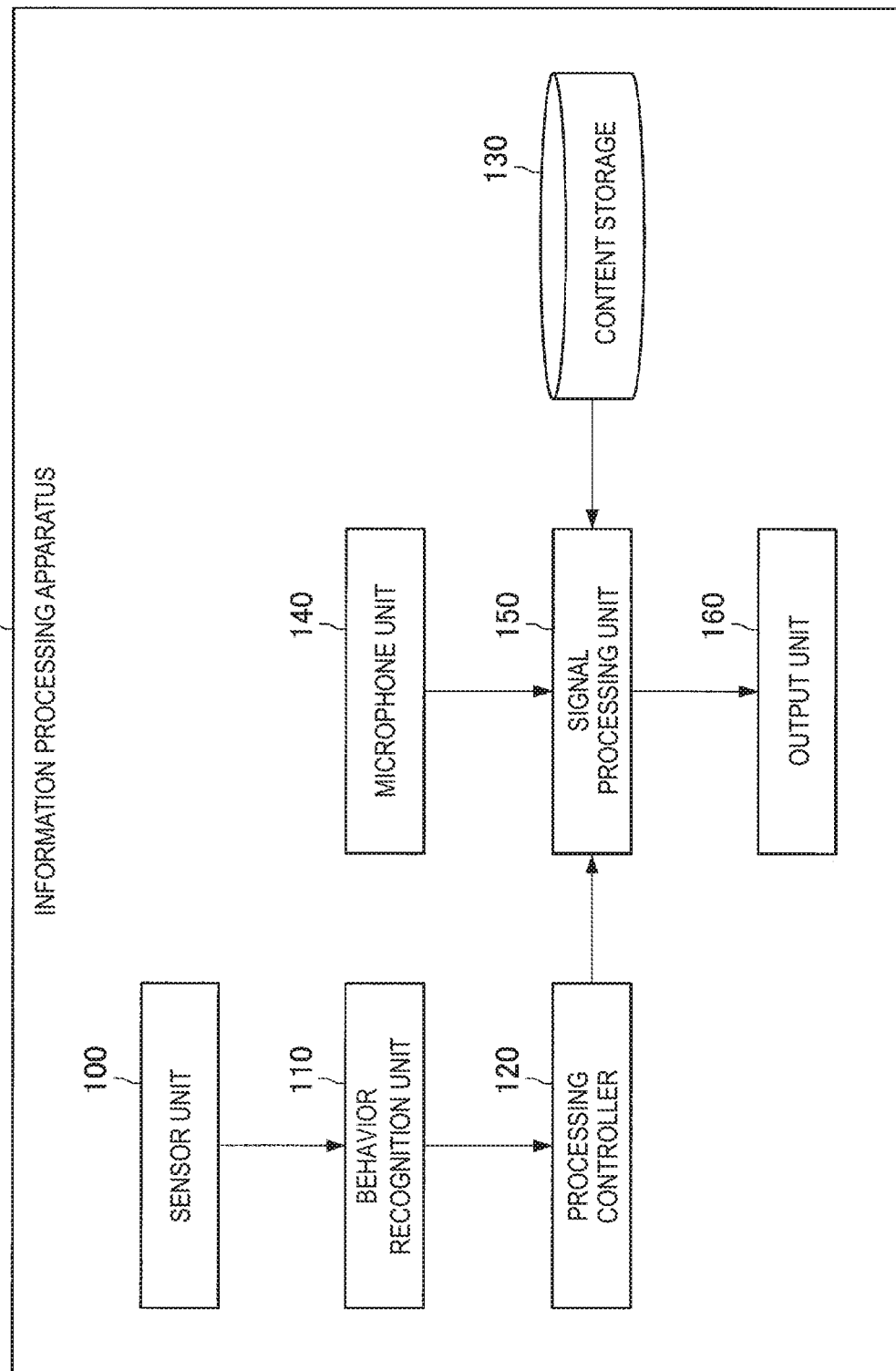
FIG. 2 is a block diagram illustrating a functional configuration of the information processing apparatus according to the embodiment.
Figure 3:
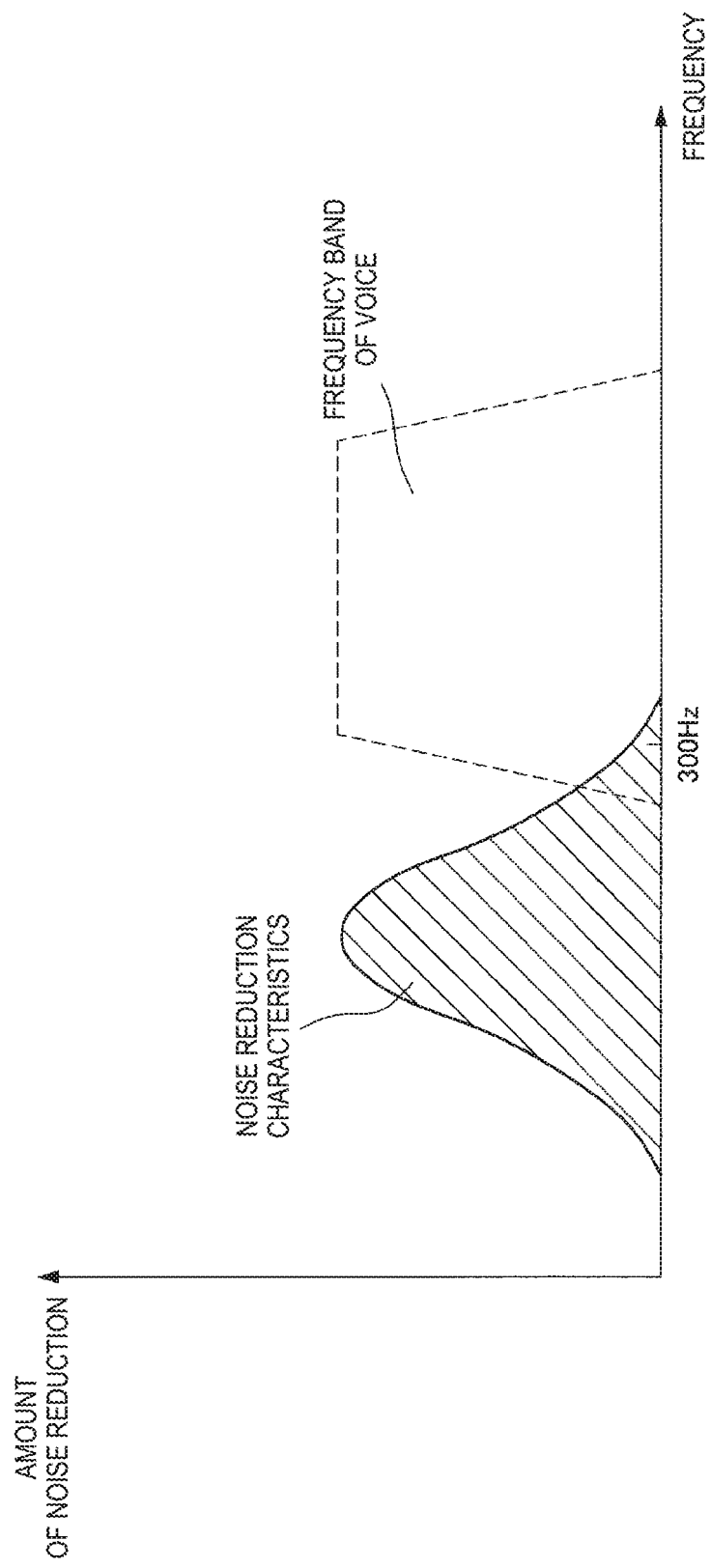
FIG. 3 is an explanatory diagram illustrating an example of an external sound monitoring function.

Subsequently, with reference to FIGS. 2 and 3, a configuration of the information processing apparatus 1 according to the present embodiment will be described. FIG. 2 is a block diagram illustrating a functional configuration of the information processing apparatus 1 according to the present embodiment, and FIG. 3 is an explanatory diagram illustrating an example of an external sound monitoring function.

As shown in FIG. 2, the information processing apparatus 1 includes a sensor unit 100, a behavior recognition unit 110, a processing controller 120, a content storage 130, a microphone unit 140, a signal processing unit 150, and an output unit 160.

The sensor unit 100 includes various sensors, and measures sensing information of at least one of the user 3 and the environment used in the behavior recognition unit 110. The various sensors included in the sensor unit 100 are, for example, an acceleration sensor, a gyro sensor, a geomagnetic sensor, a barometric sensor, a temperature sensor, a light intensity sensor, a pulse wave sensor, a GNSS sensor, a microphone, and the like. Those various sensors can measure the following as the sensing information, for example: movement information such as movement speed, a tilt, a direction, a vibration, and a position of the information processing apparatus 1 (that is, the user 3 holding the information processing apparatus 1); environment information such as an atmospheric pressure, temperature, illuminance, a sound pressure, and a sound surrounding the information processing apparatus 1; and physical information such as body temperature, blood pressure, and a pulse of the user 3 holding the information processing apparatus 1. Note that, in order for the behavior recognition unit 110 to recognize the activities of the user 3 more accurately in more detailed classification, it is preferred that the number of kinds of the various sensors included in the sensor unit 100 be larger. Further, as long as the sensor unit 100 can measure the sensing information of at least one of the user 3 and the environment, the sensor unit 100 may be provided outside the information processing apparatus 1.

The behavior recognition unit 110 recognizes the behavior of the user 3 on the basis of the sensing information of at least one of the user 3 and the environment measured by the sensor unit 100.

For the recognition of the behavior of the user 3 performed by the behavior recognition unit 110, the algorithms disclosed in JP 2006-340903A, JP 2011-81431A, and JP 2012-107992A can be used, for example.

To be specific, the behavior recognition unit 110 may calculate a walking frequency of the user 3 by calculating an autocorrelation of signals obtained from a plurality of accelerometers that detect linear motions crossing each other orthogonally and a plurality of gyro sensors that detect rotary motions of rotation axes crossing each other orthogonally. Accordingly, the behavior recognition unit 110 can recognize whether the user 3 is walking, running, stopping, or the like on the basis of the walking frequency of the user 3. Further, the behavior recognition unit 110 may determine whether a half cycle of a waveform of acceleration in a vertical direction corresponds to one step or two steps on the basis of the shape of the waveform, and may detect a walking situation of the user 3 on the basis of the determination result. Accordingly, the behavior recognition unit 110 can recognize whether the user 3 is walking, running, stopping, or the like on the basis of the walking situation of the user 3. Moreover, the behavior recognition unit 110 may allocate a score for each combination of sensing information and behavior of the user 3 in advance, and may calculate a score of behavior of the user 3 corresponding to measured sensing information, to thereby recognize the behavior of the user 3. For example, the behavior recognition unit 110 may accumulate scores of activities corresponding to pieces of measured sensing information, and may recognize the behavior having the highest score as the behavior of the user 3.

Further, the behavior recognition unit 110 may recognize, preferably in accordance with behavior recognition using a machine learning algorithm, the behavior of the user 3 on the basis of sensing information of at least one of the user 3 and the environment. To be specific, the behavior recognition unit 110 may generate a behavior recognition engine, which is for recognizing the behavior of the user 3 using the machine learning algorithm, and may recognize the behavior of the user 3 on the basis of the sensing information using the generated behavior recognition engine.

Various known algorithms can be used for the behavior recognition algorithm using machine learning, and, for example, algorithms of a support vector machine, a neural network, a hidden Markov model, k means, k neighborhood, a simple Bayesian classifier, and the like can be used.

Note that the number of and the granularity of classifications of the behavior of the user 3 recognized by the behavior recognition unit 110 may be any as far as they are the number and the granularity that can recognize each behavior of the user 3 in an appropriate certainty, and, for example, the number and the granularity can be set appropriately in accordance with the kinds of sensing information used for the recognition. Further, the recognition of the behavior of the user 3 performed by the behavior recognition unit 110 may be executed continually, or may be executed only in the case where the user 3 inputs execution instruction.

The processing controller 120 controls signal processing executed by the signal processing unit 150 on the basis of the behavior of the user 3. To be specific, the processing controller 120 may control generation of a noise reduction signal that cancels an external sound collected by the microphone unit 140. Further, the processing controller 120 may control generation of an external monitor signal for causing the external sound collected by the microphone unit 140 to be listened to by the user 3. Further, the processing controller 120 may control acoustic processing, and amplification processing for adjusting volume, of an equalizer or the like, which are to be performed on a content signal of audio content stored in the content storage 130. The processing controller 120 controls, on the basis of the behavior of the user 3, signal processing with respect to at least one of the audio signal, the noise reduction signal, and the external sound monitor signal.

Note that the processing controller 120 may control, in addition to or in place of the above-mentioned control of signal processing, selection of audio content to be played back on the basis of the recognized behavior of the user 3.

Hereinafter, the pieces of signal processing controlled by the processing controller 120 will each be described in detail.

The processing controller 120 may control, on the basis of behavior of the user 3, generation of at least one of a noise reduction signal that cancels an external sound and an external monitor signal for causing the external sound to be listened to by the user 3.

For example, in the case where the user 3 is doing exercises such as running and skiing, the processing controller 120 may control generation of an external monitor signal including the external sound, in order for the user 3 to be able to listen to a sound of an external environment. Further, the processing controller 120 may similarly control generation of the external monitor signal including the external sound also in the case where the user 3 is driving a bicycle, a car, and the like. Accordingly, in the case where the user 3 is performing activities such as doing exercises and driving, which need to pay attention to the external environment, the processing controller 120 can cause the user 3 to listen to the external environment.

For example, in the case where the user 3 is on a bus, a train, an airplane, or the like, the processing controller 120 may control generation of a noise reduction signal that cancels an external sound, in order to reduce a sound of the external environment. Accordingly, in the case where the user 3 is performing behavior which has low necessity to pay attention to the external environment, the processing controller 120 can provide the user 3 with a sound field environment that is appropriate for the user 3 to listen to audio content by cancelling the sound of the external environment. Note that the noise reduction signal that cancels the external sound can be generated by inverting a phase of a signal of a collected external sound.

For example, in the case where the user 3 is doing walking or the like, the processing controller 120 may control generation of an external monitor signal in which strength of an audio signal of a predetermined frequency band (for example, a low frequency band) of external sounds is reduced, in order for the user to only listen to the sound that the user 3 needs among the external sounds. Accordingly, in the case where the user 3 is doing behavior that is apt to generate a noise sound of a specific frequency band, such as wind noise, the processing controller 120 can provide a sound field environment that is appropriate for listening to an external sound and audio content by selectively cancelling the noise sound. Further, in the case where the user 3 is walking, the processing controller 120 can also control generation of an external monitor signal that causes the user 3 to selectively listen to a frequency band of running sounds of cars.

Such an external monitor signal in which a specific frequency band is selectively cancelled can be generated by, as shown in FIG. 3, for example, superimposing a noise reduction signal having noise reduction characteristics in a frequency band (for example, equal to or lower than 300 Hz) that is lower than the frequency band of human voice on a signal of the external sound. Further, such an external monitor signal can be generated by subjecting the external sound to signal processing using a band-stop filter that reduces a signal of a specific frequency band.

Note that, in the case where the user 3 is moving, the processing controller 120 may control generation of an external monitor signal in which strength of an audio signal of a frequency band corresponding to movement speed of the user 3 among the external sounds is selectively cancelled. To be specific, the processing controller 120 may prepare a plurality of band-stop filters having different reducible frequency bands, and may perform signal processing on an external sound using different band-stop filters depending on the movement speed of the user 3. It is considered that the frequency and the strength of wind noise that occurs along with the movement of the user 3 change in accordance with the movement speed of the user 3. Therefore, the processing controller 120 can effectively cancel the noise sound such as the wind noise by changing the frequency band in which signal strength is reduced depending on the movement speed of the user 3, and can thereby provide the user 3 with a sound field environment appropriate for listening to an external sound and audio content.

Further, the processing controller 120 may control, on the basis of behavior of the user 3, acoustic processing performed on a content signal such as audio content. Examples of the acoustic processing include equalizer processing for changing distribution of frequency components of the content signal, virtual (or pseudo) surround processing for assigning ambience to the content signal using characteristics of human hearing, and the like. Note that the equalizer processing also includes, in addition to the equalizer processing performed on the content signal for changing the quality of sound of the audio content, the equalizer processing performed on the content signal in order to superimpose the content signal of the audio content on the noise reduction signal or the external monitor signal.

For example, in the case where the user 3 is on a bus, a train, an airplane, and the like, the processing controller 120 may control the equalizer processing such that signal strength of a low frequency band of the content signal is increased. Accordingly, in the case where the user 3 is doing behavior in which the noise sound in a low frequency band of the external sound is large, the processing controller 120 can make it easy for the user 3 to listen to audio content by increasing the signal strength of a low frequency band of the audio content.

For example, in the case where the user 3 is doing exercises such as running and skiing, the processing controller 120 may control the virtual (or pseudo) surround processing such that higher ambience is assigned to a content signal. Accordingly, the processing controller 120 can control signal processing of the content signal such that the feeling of the user 3 doing exercises rises by increasing the ambience of audio content listened to by the user 3.

Moreover, in the case where amplification processing to be performed on a content signal is controlled in accordance with behavior of the user 3, the processing controller 120 controls the amplification processing to be performed on the content signal such as audio content on the basis of the behavior of the user 3. The amplification processing is, for example, signal processing for controlling volume of the audio content.

For example, in the case where the user 3 is driving a bicycle, a car, and the like, the processing controller 120 may decrease the amount of amplification of the amplification processing performed on the content signal. Accordingly, the processing controller 120 can cause the user 3 to concentrate his/her attention more on the driving by decreasing the volume of the audio content listened to by the user 3.

For example, in the case where the user 3 is on a bus, a train, an airplane, or the like, the processing controller 120 may increase the amount of amplification of the amplification processing performed on the content signal. Accordingly, in the case where the user 3 is performing behavior which generates large external sound, the processing controller 120 can cause the user 3 to listen to the audio content more easily by increasing the volume of the audio content listened to by the user 3.

Note that what kind of signal processing is allocated to the recognized behavior of the user 3 by the processing controller 120 is not limited to the above-mentioned examples and can be set freely. The control of the processing controller 120 may be set in advance, or may be settable by the user 3 appropriately through software or the like.

The content storage 130 is a storage device included in the information processing apparatus 1, and stores audio content listened to by the user 3. The content storage 130 may be a known storage device, and may be, for example, a flash memory, a solid state drive (SSD) device, or a hard disk drive (HDD) device.

Note that the audio content listened to by the user 3 may be stored in a storage device inside the information processing apparatus 1 as shown in FIG. 2, but the technology according to the present disclosure is not limited to such an example. For example, the audio content may be stored in an external storage device and may be input to the information processing apparatus 1 through an external input interface, or may be streaming-transmitted to the information processing apparatus 1 through a network or the like.

The microphone unit 140 includes an acoustic device such as a microphone, and collects an external sound used in the signal processing unit 150 for generating at least one of a noise reduction signal and an external sound monitor signal. The microphone unit 140 may be included in the information processing apparatus 1, and may also be included in the acoustic device 2 used for the listening of audio content. In the case where the microphone unit 140 is included in the acoustic device 2, the microphone unit 140 may be provided in an outer part of a housing worn by the user 3 of the acoustic device 2 on his/her ear, may be provided in an inner part of the housing, or may be provided both in an outer part of and in an inner part of the housing.

The signal processing unit 150 performs signal processing on an external sound collected by the microphone unit 140, to thereby generate at least one of a noise reduction signal and an external sound monitor signal. Further, the signal processing unit 150 performs signal processing on audio content stored in the content storage 130, to thereby generate an audio signal listened to by the user 3. Note that the details of the signal processing performed by the signal processing unit 150 is controlled by the processing controller 120 on the basis of the recognized behavior of the user 3.

To be specific, the signal processing unit 150 generates at least one of a noise reduction signal that cancels an external sound collected by the microphone unit 140 and an external monitor signal for causing the external sound collected by the microphone unit 140 to be listened to by the user 3. Further, the signal processing unit 150 performs acoustic processing and amplification processing on a content signal of audio content stored in the content storage 130. Moreover, the signal processing unit 150 superimposes the noise reduction signal or the external monitor signal on the content signal on which various pieces of signal processing are performed, to thereby generate an audio signal listened to by the user 3. Accordingly, the signal processing unit 150 can execute optimum signal processing depending on behaviors or situations of the user 3.

Note that the signal processing performed by the signal processing unit 150 may be executed continually, or may be executed only in the case where the user 3 inputs execution instruction.

The output unit 160 outputs at least one of the audio signal, the noise reduction signal, and the external sound monitor signal generated by the signal processing unit 150. For example, the output unit 160 may be an acoustic device such as a speaker which outputs to the user 3 at least one of the audio signal, the noise reduction signal, and the external sound monitor signal generated by the signal processing unit 150. Further, the output unit 160 may also be an external output interface including a universal serial bus (USB) terminal, an optical audio terminal, and the like, which outputs to an external acoustic device 2 at least one of the audio signal, the noise reduction signal, and the external sound monitor signal generated by the signal processing unit 150.

Figure 4:
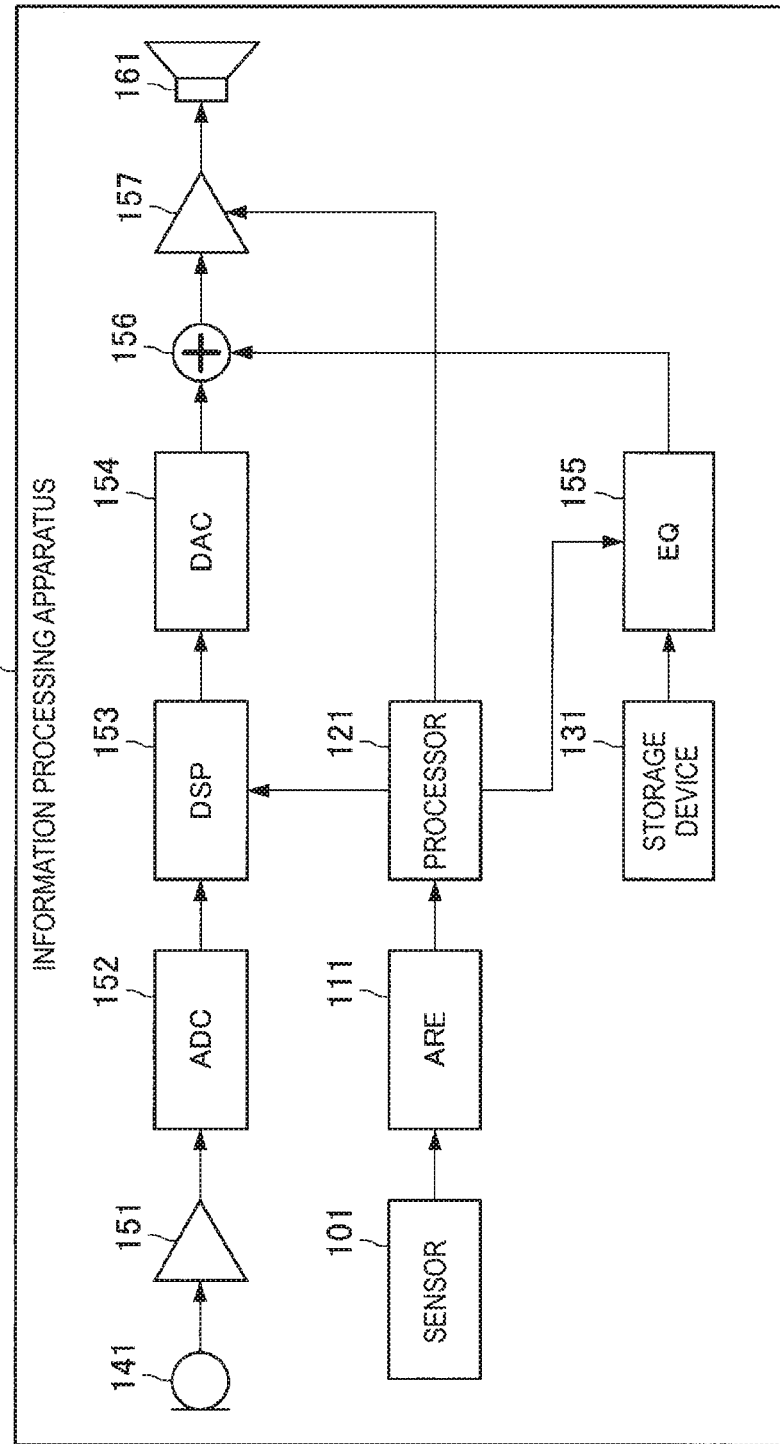
FIG. 4 is a block diagram illustrating a circuit configuration or the like of the information processing apparatus according to the embodiment.

Next, with reference to FIG. 4, the information processing apparatus 1 according to the present embodiment will be described more specifically. FIG. 4 is a block diagram illustrating a circuit configuration or the like of the information processing apparatus 1 according to the present embodiment.

As shown in FIG. 4, sensing information of at least one of the user 3 and the environment is measured by various sensors 101 corresponding to the sensor unit 100. Further, a behavior recognition engine (ARE) 111 corresponding to the behavior recognition unit 110 recognizes behavior of the user 3 on the basis of the measured sensing information of at least one of the user 3 and the environment. A processor 121 corresponding to the processing controller 120 controls signal processing executed by a digital signal processor (DSP) 153, an equalizer (EQ) 155, and a power amplifier 157, on the basis of the recognized behavior of the user 3.

Further, a microphone 141 corresponding to the microphone unit 140 collects an external sound. The collected external sound is amplified by a microphone amplifier 151, then is converted into a digital signal by an analog to digital converter (ADC) 152. The digital signal processor 153 performs signal processing on the audio signal of the digital converted external sound on the basis of the control performed by the processor 121, and generates at least one of a noise reduction signal and an external sound monitor signal. At least one of the noise reduction signal and the external sound monitor signal that has been generated is converted into an analog signal by a digital to analog converter (DAC) 154.

On the other hand, a storage device 131 corresponding to the content storage 130 stores audio content, and the equalizer 155 performs acoustic processing on the audio content on the basis of the control performed by the processor 121.

An adding circuit 156 adds at least one of the noise reduction signal and the external sound monitor signal that has been converted by the digital to analog converter 154 to a content signal of the audio content on which the acoustic processing is performed by the equalizer 155. Further, on the added signal, amplification processing is performed by the power amplifier 157 on the basis of the control performed by the processor 121. The signal on which the amplification processing has been performed is output in a manner that the user 3 can be listened to, by a speaker 161 corresponding to the output unit 160. That is, the microphone amplifier 151, the analog to digital converter 152, the digital signal processor 153, the digital to analog converter 154, the equalizer 155, the adding circuit 156, and the power amplifier 157 correspond to the signal processing unit 150.

With such a configuration, the information processing apparatus 1 according to the present embodiment can perform appropriate signal processing on at least one of the audio signal, the noise reduction signal, and the external sound monitor signal, depending on the behavior of the user 3 recognized by the sensing information of at least one of the user 3 and the environment.

Note that the information processing performed by the information processing apparatus 1 according to the present embodiment is achieved by cooperation of software and hardware. Examples of hardware included in the information processing apparatus 1 include a central processing unit (CPU), read only memory (ROM), random access memory (RAM), and the like, which are connected to each other through a bridge, an internal bus, and the like.

To be specific, the CPU functions as an arithmetic processing unit or a control unit, and controls entire operation of the information processing apparatus 1 in accordance with various programs stored in the ROM and the like. The ROM stores a program, a calculation parameter, and the like used by the CPU, and the RAM temporarily stores a program used in execution of the CPU, a parameter varying as appropriate during the execution, and the like.

Further, it is also possible to create a computer program for causing hardware such as the CPU, the ROM, and the RAM to exhibit substantially the same functions as the respective functions of the information processing apparatus 1 according to the present embodiment. Further, there is also provided a storage medium having the computer program stored therein.

[1.3. Operation of Information Processing Apparatus]

Next, with reference to FIGS. 5 to 7, operation of the information processing apparatus 1 according to the present embodiment will be described.

Figure 5:
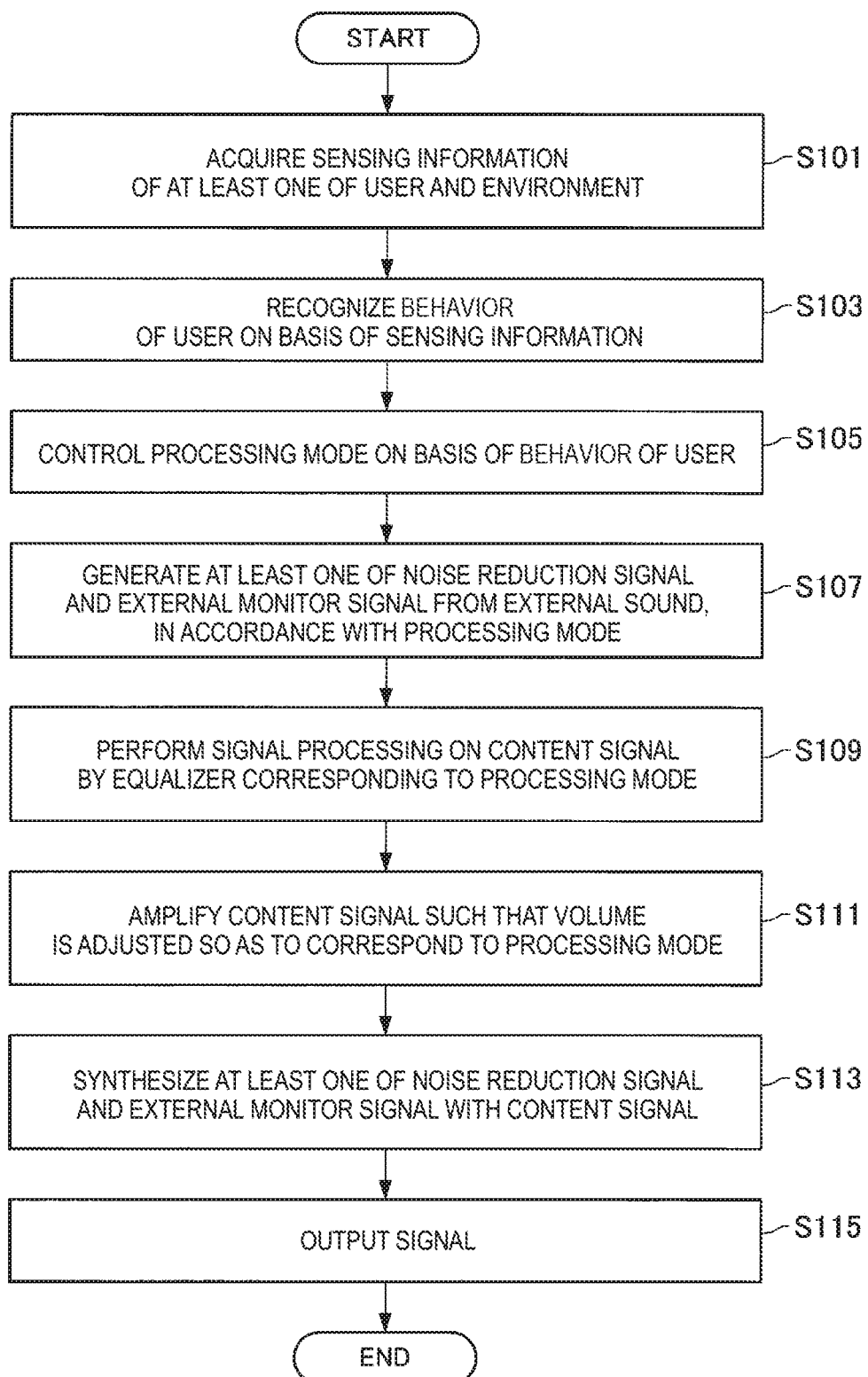
FIG. 5 is a flowchart showing an operation example of the information processing apparatus according to the embodiment.

FIG. 5 is a flowchart showing an operation example of the information processing apparatus 1 according to the embodiment. Note that the operation example shown below is merely an example, and the operation of the information processing apparatus 1 according to the present embodiment is not limited to the example shown below.

As shown in FIG. 5, first, the sensor unit 100 measures sensing information of at least one of the user 3 and the environment (S101). Subsequently, the behavior recognition unit 110 recognizes behavior of the user 3 on the basis of the measured sensing information of at least one of the user 3 and the environment (S103). Next, the processing controller 120 controls a processing mode of signal processing on the basis of the behavior of the user 3 (S105).

Here, in accordance with the processing mode controlled by the processing controller 120, the signal processing unit 150 performs signal processing on an external sound collected by the microphone unit 140 and generates at least one of a noise reduction signal and an external sound monitor signal (S107). Further, the signal processing unit 150 performs signal processing on a content signal of audio content stored in the content storage 130 by an equalizer corresponding to the processing mode controlled by the processing controller 120 (S109). Moreover, the signal processing unit 150 amplifies the content signal of the audio content such that volume is adjusted so as to correspond to the processing mode controlled by the processing controller 120 (S111). Subsequently, the signal processing unit 150 superimposes at least one of the noise reduction signal and the external sound monitor signal that has been generated on the content signal on which the signal processing has been performed (S113). After that, the output unit 160 outputs the generated signal to the user 3 or to the acoustic device 2 (S115).

With the above operation, the information processing apparatus 1 can perform appropriate signal processing on at least one of the audio signal, the noise reduction signal, and the external sound monitor signal, depending on the behavior of the user 3.

Subsequently, with reference to FIGS. 6 and 7, actual examples of operation of the information processing apparatus 1 according to the present embodiment will be described. FIGS. 6 and 7 are each a flowchart showing an actual example of operation of the information processing apparatus 1 according to the present embodiment.

First, with reference to FIG. 6, there will be described an actual example of operation of the information processing apparatus 1 in the case where the user 3 is doing various exercises at an open road or the like.

Figure 6:
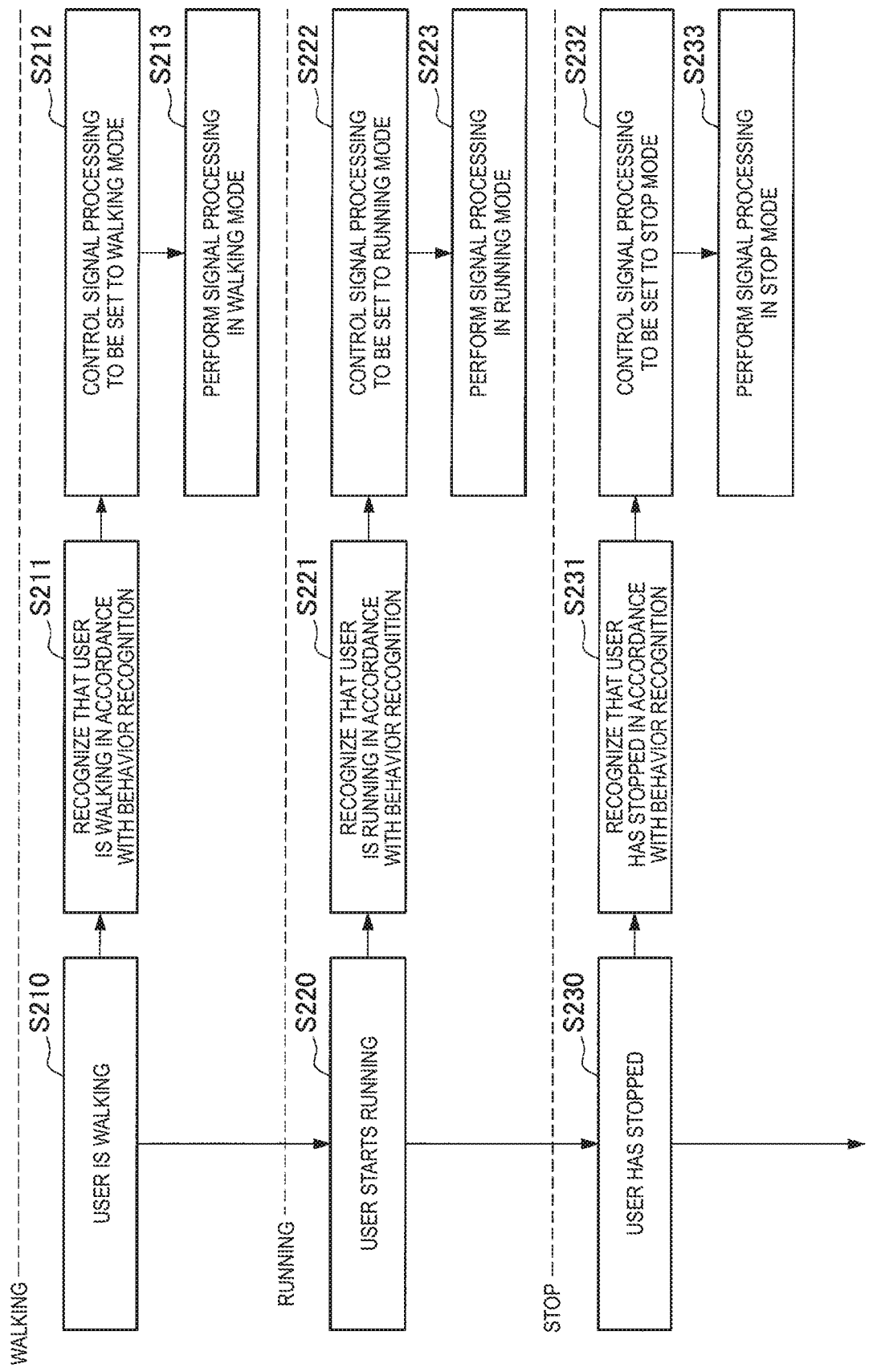
FIG. 6 is a flowchart showing an actual example of operation of the information processing apparatus according to the embodiment.

As shown in FIG. 6, for example, in the case where the user 3 is walking (S210), the information processing apparatus 1 recognizes that the user 3 is walking in accordance with behavior recognition using sensing information with respect to the user 3 (S211), and controls signal processing to be set to a walking mode (S212). Further, the information processing apparatus 1 performs the signal processing in the walking mode, and generates an audio signal to be listened to by the user 3 (S213). Here, the signal processing in the walking mode may include generating an external monitor signal so that the user 3 can listen to the external sound, for example.

Next, in the case where the user 3 starts running (S220), the information processing apparatus 1 recognizes that the user 3 is running in accordance with behavior recognition using sensing information with respect to the user 3 (S221), and controls signal processing to be set to a running mode (S222). Further, the information processing apparatus 1 performs the signal processing in the running mode, and generates an audio signal to be listened to by the user 3 (S223). Here, the signal processing in the running mode may include generating an external monitor signal in which a sound of a low frequency band such as wind noise is reduced, for example.

Further, in the case where the user 3 has stopped (S230), the information processing apparatus 1 recognizes that the user 3 has stopped in accordance with behavior recognition using sensing information with respect to the user 3 (S231), and controls signal processing to be set to a stop mode (S232). Further, the information processing apparatus 1 performs the signal processing in the stop mode, and generates an audio signal to be listened to by the user 3 (S233). Here, the signal processing in the stop mode may include generating a noise reduction signal that cancels an external sound, for example.

Next, with reference to FIG. 7, there will be described an actual example of operation of the information processing apparatus in the case where the user 3 is skiing or snowboarding on a ski slope or the like.

Figure 7:
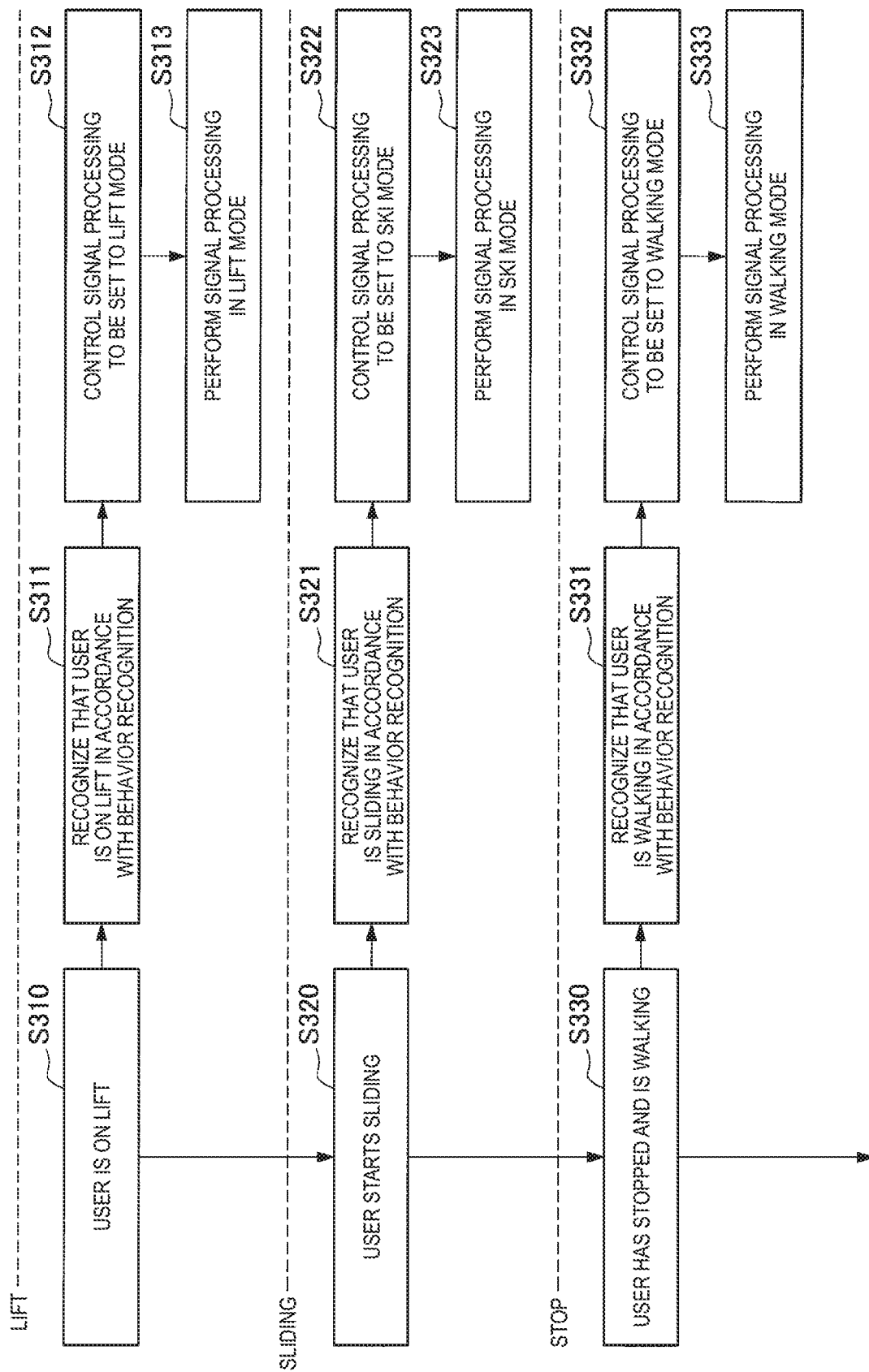
FIG. 7 is a flowchart showing another actual example of operation of the information processing apparatus according to the embodiment.

As shown in FIG. 7, for example, in the case where the user 3 is on a lift (S310), the information processing apparatus 1 recognizes that the user 3 is on the lift in accordance with behavior recognition using sensing information with respect to the user and the environment (S311), and controls signal processing to be set to a lift mode (S312). Further, the information processing apparatus 1 performs the signal processing in the lift mode, and generates an audio signal to be listened to by the user 3 (S313). Here, the signal processing in the lift mode may include generating a noise reduction signal that cancels an external sound, for example.

Next, in the case where the user 3 starts a slide (S320), the information processing apparatus 1 recognizes that the user 3 is sliding on the ski slope in accordance with behavior recognition using sensing information with respect to the user and the environment (S321), and controls signal processing to be set to a ski mode (S322). Further, the information processing apparatus 1 performs the signal processing in the ski mode, and generates an audio signal to be listened to by the user 3 (S323). Here, the signal processing in the ski mode may include generating an external monitor signal in which a sound of a low frequency band such as wind noise is reduced, for example.

Further, in the case where the user 3 has finished sliding and is walking on the ski slope (S330), the information processing apparatus 1 recognizes that the user 3 has stopped sliding and is walking in accordance with behavior recognition using sensing information with respect to the user and the environment (S331), and controls signal processing to be set to a walking mode (S332). Further, the information processing apparatus 1 performs the signal processing in the walking mode, and generates an audio signal to be listened to by the user 3 (S333). Here, the signal processing in the walking mode may include generating an external monitor signal so that the user 3 can listen to an external sound, for example.

In this manner, the information processing apparatus 1 according to the present embodiment can perform appropriate signal processing on at least one of the audio signal, the noise reduction signal, and the external sound monitor signal depending on the behavior of the user 3.

[1.4. Modified Example of Information Processing Apparatus]

Figure 8:
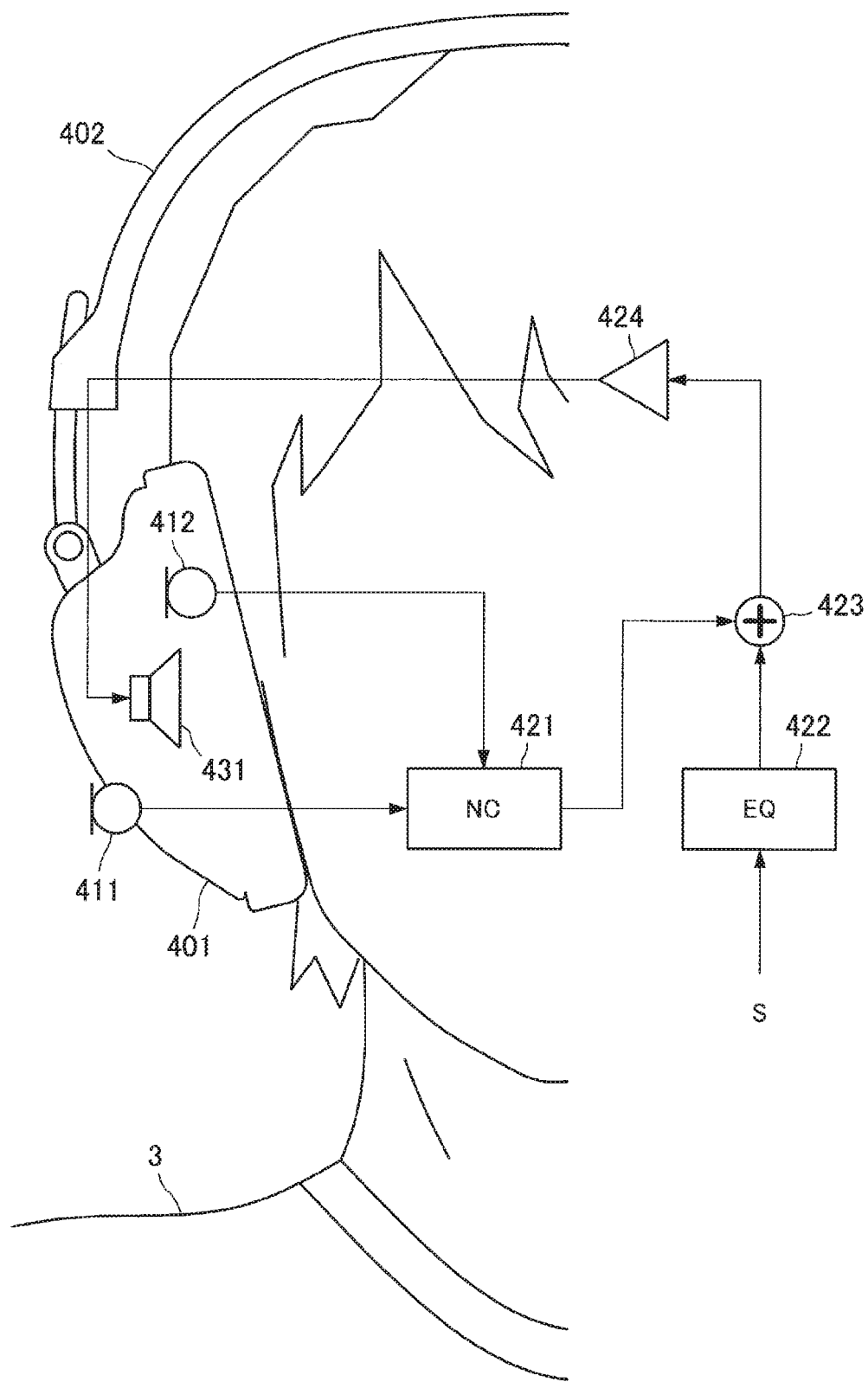
FIG. 8 is a schematic diagram illustrating an overview of an information processing apparatus according to a modified example of the embodiment.

Subsequently, with reference to FIG. 8, an information processing apparatus 1 according to a modified example of the first embodiment will be described. FIG. 8 is a schematic diagram illustrating an overview of the information processing apparatus 1 according to the present modified example. The information processing apparatus 1 according to the present modified example includes microphones, which collect external sounds, both in an inner part of and in an outer part of a housing worn by the user 3 on his/her ear, and generates a noise reduction signal on the basis of the external sounds collected by the respective microphones.

As shown in FIG. 8, the information processing apparatus 1 according to the present modified example is, more specifically, a headphone including a sounding body 431 in a housing 401 worn by the user 3 on his/her ear. Note that the housing 401 is connected to a housing (not shown) that covers an ear of the user 3 at the opposite side by a head band 402.

In the information processing apparatus 1 according to the present modified example, microphones 411 and 412 are provided in an outer part of and in an inner part of the housing 401, respectively, and collect external sounds of the outside and the inside of the housing 401, respectively. A noise-cancelling circuit 421 generates noise reduction signals on the basis of the external sounds collected by the microphones 411 and 412, respectively, and generates a synthesized noise reduction signal by synthesizing the respective generated noise reduction signals.

On the other hand, a content signal S of audio content is subjected to signal processing by an equalizer 422. The content signal S that has been subjected to the signal processing is added to the synthesized noise reduction signal by an adding circuit 423, and after that, the resultant is amplified by a power amplifier 424 and is converted into a sound by the sounding body 431.

Here, the type that performs noise reduction using the external sound collected outside the housing 401 is also called a feedback type. The band in which the feedback type is able to reduce noise is generally narrow, but the feedback type can perform relatively large reduction. On the other hand, the type that performs noise reduction using the external sound collected inside the housing 401 is also called a feedforward type. The band in which the feedforward type is able to reduce noise is generally broad, but there is a possibility that the feedforward type may oscillate by a sound generated from the sounding body 431.

The information processing apparatus 1 according to the present modified example can perform noise reduction having advantages of the feedback type and the feedforward type by combining the feedback type and the feedforward type and performing the noise reduction. Further, the information processing apparatus 1 recognizes the behavior of the user 3 on the basis of the sensing information, and performs the above-mentioned noise reduction or the like depending on the recognized behavior of the user 3; thus makes it possible for the user 3 to listen to an audio signal more appropriately.

2. Second Embodiment

Next, with reference to FIGS. 9 and 10, an information processing apparatus 1A according to a second embodiment of the present disclosure will be described. The information processing apparatus 1A according to the present embodiment improves accuracy in recognizing behavior of a user 3 by recognizing the behavior of the user 3 by further using, in addition to the sensing information of at least one of the user 3 and an environment, a result obtained by analyzing an external sound collected by a microphone unit 140.

[2.1. Configuration of Information Processing Apparatus]

First, with reference to FIG. 9, a functional configuration of the information processing apparatus 1A according to the present embodiment will be described. FIG. 9 is a block diagram showing an internal configuration of the information processing apparatus 1A according to the present embodiment.

Figure 9:
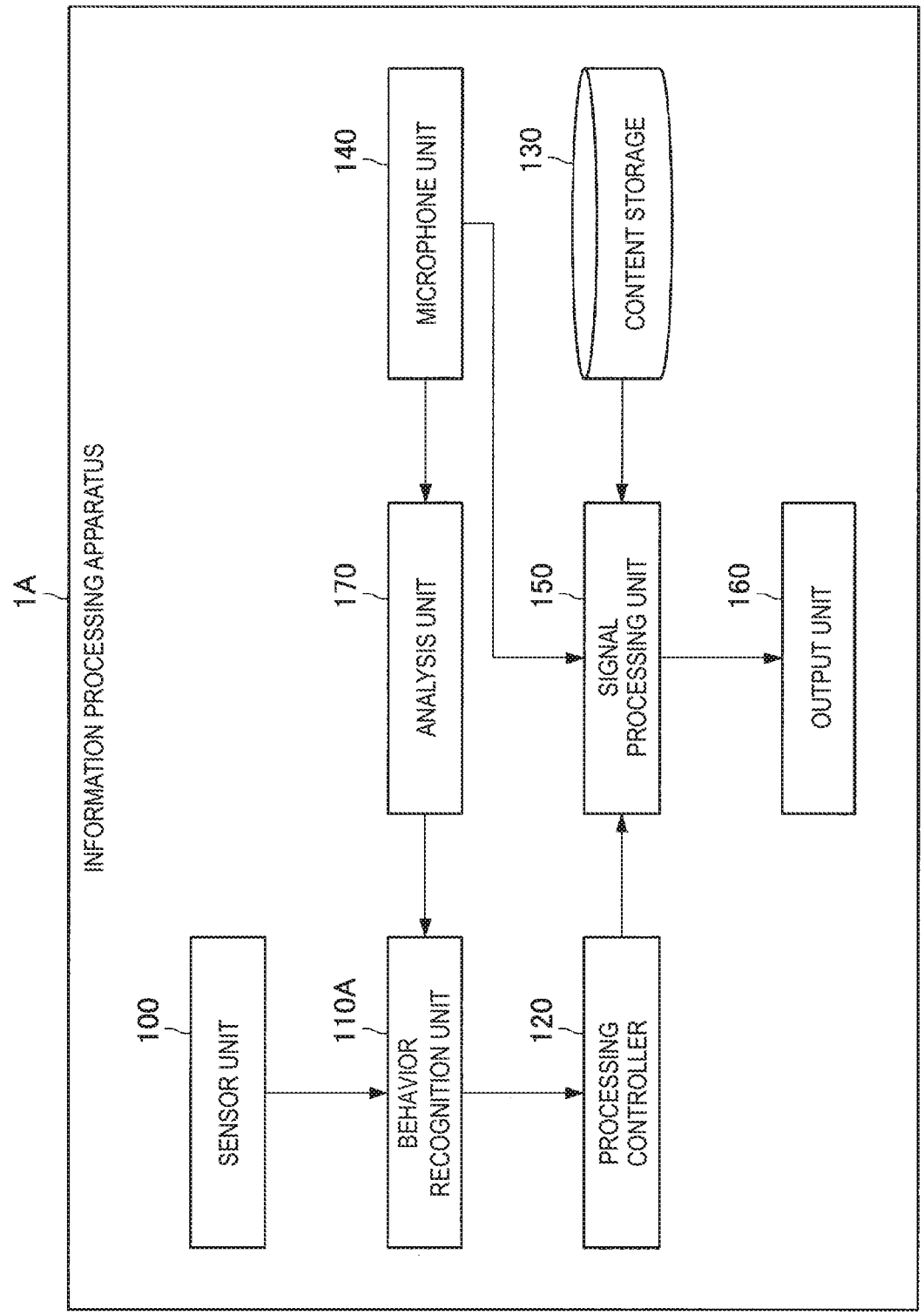
FIG. 9 is a block diagram showing an internal configuration of an information processing apparatus according to a second embodiment of the present disclosure.

As shown in FIG. 9, the information processing apparatus 1A includes a sensor unit 100, a behavior recognition unit 110A, a processing controller 120, a content storage 130, a microphone unit 140, a signal processing unit 150, an output unit 160, and an analysis unit 170.

Here, the specific configurations of the sensor unit 100, the processing controller 120, the content storage 130, the microphone unit 140, the signal processing unit 150, and the output unit 160 are substantially similar to the configurations described in the first embodiment; accordingly, the detailed description will be omitted here.

The analysis unit 170 analyzes an external sound collected by the microphone unit 140, to thereby determine an environment surrounding the user 3. For example, the analysis unit 170 may determine the environment surrounding the user 3 on the basis of strength and a frequency band of a noise sound included in the external sound. To be specific, the analysis unit 170 may consider a sound in a band having a frequency lower than or equal to the frequency band of human voice (for example, 300 Hz) among external sounds as the noise sound, and, on the basis of the distribution of the strength and the frequency of the noise sound, may determine the environment surrounding the user 3. For example, examples of the environment surrounding the user 3 that can be determined by the analysis unit 170 include "inside a train", "inside an airplane", "other than inside a train or inside an airplane", and the like.

The behavior recognition unit 110A recognizes the behavior of the user 3 on the basis of: sensing information of at least one of the user 3 and the environment which is measured by the sensor unit 100; and the environment surrounding the user 3 analyzed by the analysis unit 170. Here, among the activities of the user 3, there are the ones that are closely associated with the environment surrounding the user 3. For example, in the case where the user 3 is on a vehicle such as a car, a bus, a train, or an airplane, the environment surrounding the user 3 is limited to inside the vehicle.

Accordingly, in the case where the environment surrounding the user 3 determined by the analysis unit 170 is the one that limits the behavior of the user 3, the behavior recognition unit 110A may recognize the behavior of the user 3 on the basis of the environment surrounding the user 3. To be specific, in the case where the analysis unit 170 determines that the environment surrounding the user 3 is inside a car, a bus, a train, an airplane, or the like, the behavior recognition unit 110A may recognize that that the user 3 is on a car, a bus, a train, or an airplane. Accordingly, the behavior recognition unit 110A can recognize the behavior of the user 3 with higher accuracy.

Further, the behavior recognition unit 110A may recognize the behavior of the user 3 by preferentially using the sensing information of at least one of the user 3 and the environment. For example, first, the behavior recognition unit 110A may recognize the behavior of the user 3 by using the sensing information of at least one of the user 3 and the environment, and then, only in the case where it is not possible to recognize the behavior of the user 3 on the basis of the sensing information, may recognize the behavior of the user 3 on the basis of the environment surrounding the user 3.

[2.2. Operation of Information Processing Apparatus]

Next, with reference to FIG. 10, an actual example of operation of the information processing apparatus 1A according to the present embodiment will be described. FIG. 10 is a flowchart showing an actual example of operation of the information processing apparatus 1A according to the present embodiment. FIG. 10 shows an actual example of operation of the information processing apparatus 1A in the case where the user 3 gets on a train from a platform.

Figure 10:
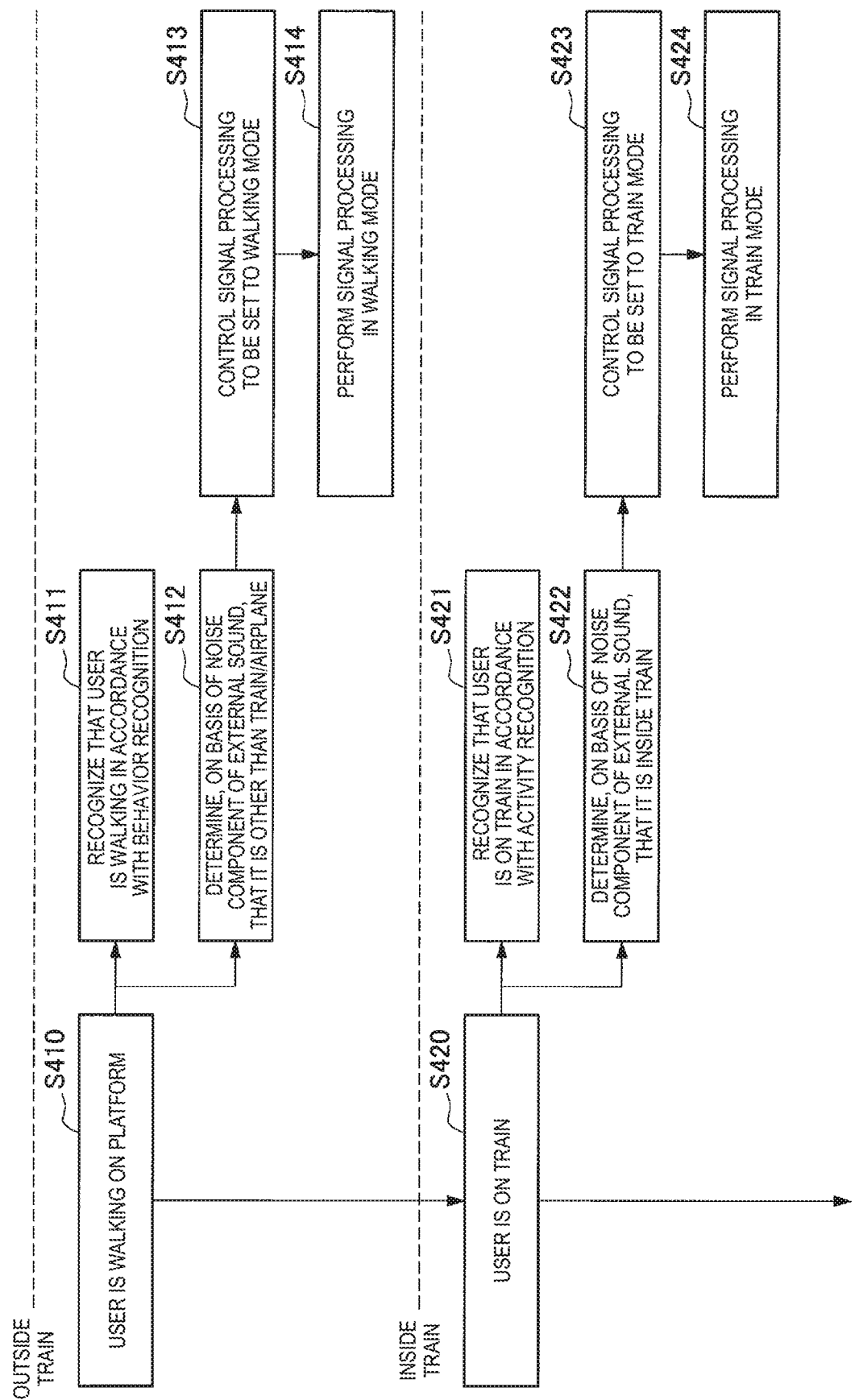
FIG. 10 is a flowchart showing an actual example of operation of the information processing apparatus according to the embodiment.

As shown in FIG. 10, for example, in the case where the user 3 is walking on a platform (S410), the information processing apparatus 1A recognizes that the user 3 is walking in accordance with behavior recognition using sensing information with respect to the user 3 (S411). Further, the information processing apparatus 1A determines, on the basis of a noise component of an external sound, that the environment surrounding the user 3 is other than inside a train or inside an airplane (S412).

Accordingly, the information processing apparatus 1A recognizes that the behavior of the user 3 is walking, and controls signal processing to be set to a walking mode (S413). Further, the information processing apparatus 1A performs the signal processing in the walking mode, and generates an audio signal to be listened to by the user 3 (S414). Here, the signal processing in the walking mode may include generating an external monitor signal so that the user 3 can listen to the external sound, for example.

Next, in the case where the user 3 is on the train (S420), the information processing apparatus 1A recognizes that the user 3 is on the train in accordance with behavior recognition using sensing information with respect to the user 3 (S421). Further, the information processing apparatus 1A determines, on the basis of a noise component of an external sound, that the environment surrounding the user 3 is inside a train (S422).

Accordingly, the information processing apparatus 1A recognizes that the user 3 is on the train, and controls signal processing to be set to a train mode (S433). Further, the information processing apparatus 1A performs the signal processing in the train mode, and generates an audio signal to be listened to by the user 3 (S434). Here, the signal processing in the walking mode may include generating a noise reduction signal that cancels an external sound, so that a sound field environment appropriate for listening to audio content can be provided, for example.

In this manner, the information processing apparatus 1A according to the present embodiment can recognize the behavior of the user 3 with higher accuracy by performing the recognition further on the basis of the environment surrounding the user 3 determined on the basis of the collected external sound. Therefore, the information processing apparatus 1A according to the present embodiment can perform appropriate signal processing on at least one of the audio signal, the noise reduction signal, and the external sound monitor signal.

3. Third Embodiment

[3.1. Configuration of Information Processing Apparatus]

Next, with reference to FIGS. 11 and 12, an information processing apparatus 1B according to a third embodiment of the present disclosure will be described. The information processing apparatus 1B according to the present embodiment recognizes behavior of the user 3 with higher accuracy and granularity by further using behavior pattern of the user 3 recognized in accordance with a history of position information of the user 3 acquired by a position information acquisition unit 180.

Figure 11:
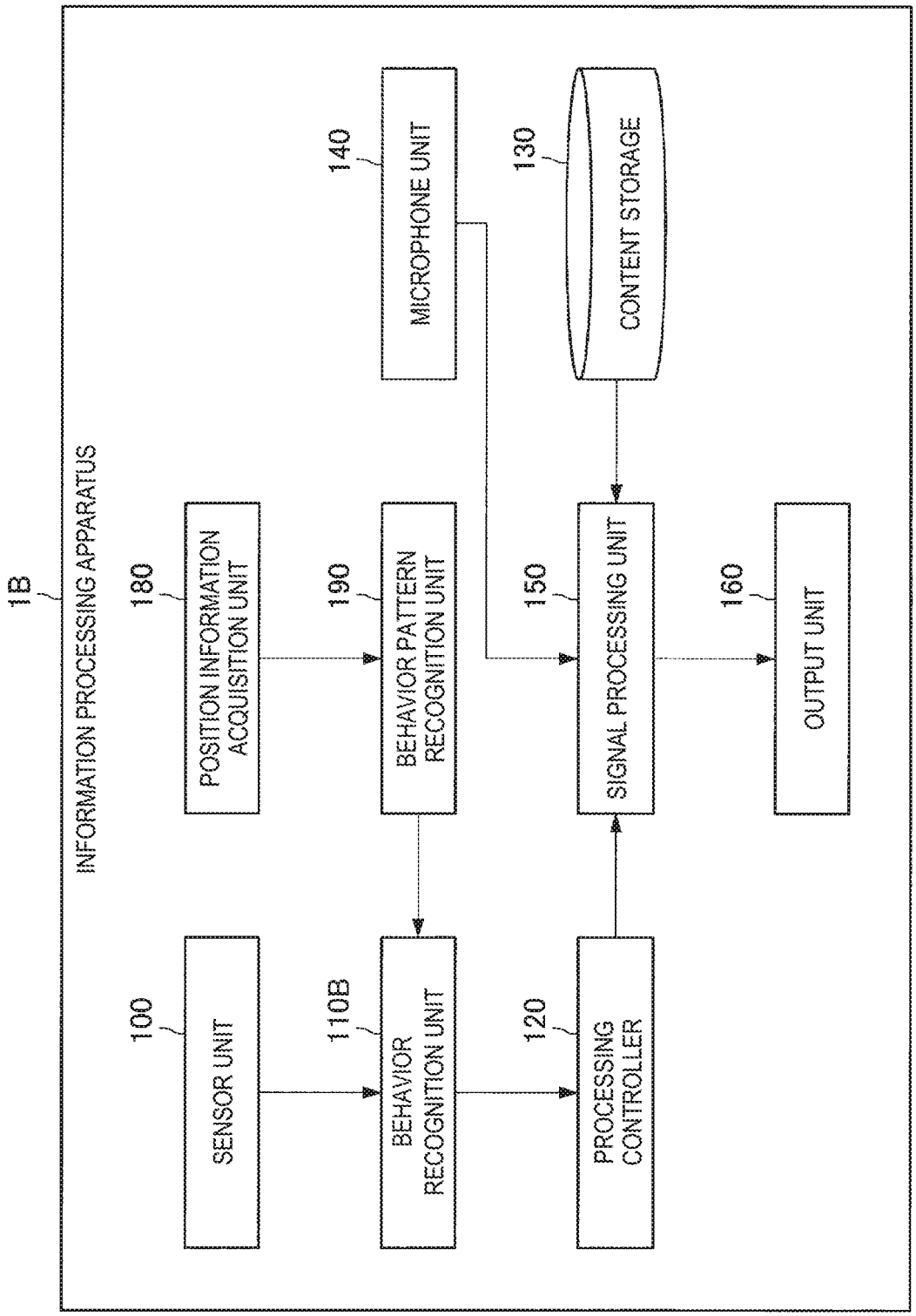
FIG. 11 is a block diagram showing an internal configuration of an information processing apparatus according to a third embodiment of the present disclosure.

Here, FIG. 11 is a block diagram showing an internal configuration of the information processing apparatus 1A according to the present embodiment. Further, FIG. 12 is a schematic diagram showing a map on which a history of pieces of position information of the user 3 acquired by the position information acquisition unit 180 is plotted.

As shown in FIG. 11, the information processing apparatus 1B includes a sensor unit 100, a behavior recognition unit 110B, a processing controller 120, a content storage 130, a microphone unit 140, a signal processing unit 150, an output unit 160, a position information acquisition unit 180, and a behavior pattern recognition unit 190.

Here, the specific configurations of the sensor unit 100, the processing controller 120, the content storage 130, the microphone unit 140, the signal processing unit 150, and the output unit 160 are substantially similar to the configurations described in the first embodiment; accordingly, the detailed description will be omitted here.

The position information acquisition unit 180 acquires position information (that is, the position information of the user 3) of the information processing apparatus 1B. For example, the position information acquisition unit 180 may be a GNSS sensor that calculates a position of the information processing apparatus 1B on the basis of signals each attached with time information transmitted from a plurality of satellites. Further, the position information acquisition unit 180 may also be an assisted global navigation satellite system (A-GNSS) that calculates the position of the information processing apparatus 1B by receiving information which assists measurement performed by the GNSS from a network or the like. Moreover, the position information acquisition unit 180 may also calculate the position of the information processing apparatus 1B in accordance with a triangulation method using a distance from a base station in a mobile telecommunications network or a distance from an access point of Wi-Fi (registered trademark).

The behavior pattern recognition unit 190 recognizes the behavior pattern of the user 3 on the basis of the history of position information of the user 3 acquired by the position information acquisition unit 180.

Figure 12:
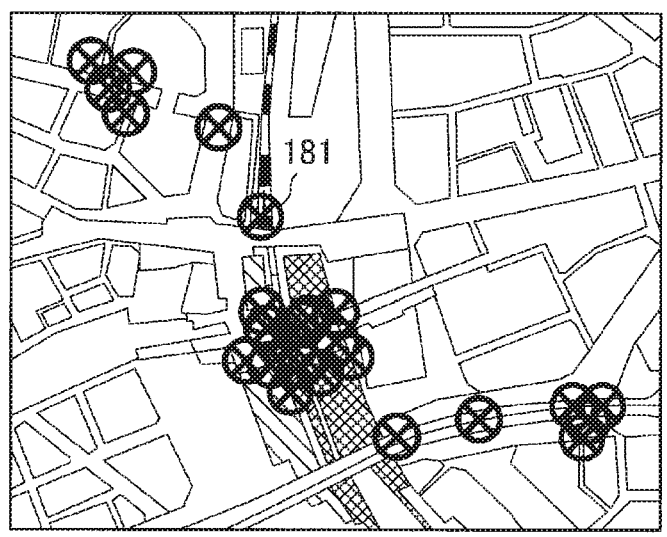
FIG. 12 is a schematic diagram showing a map on which pieces of position information of a user are plotted.

For example, as shown in FIG. 12, the behavior pattern recognition unit 190 can acquire a history of transition of the position information of the user 3 by plotting pieces of position information 181 of the user 3 acquired by the position information acquisition unit 180 on a map in time-series order. For example, in the case where the position information of the user 3 transitions on a railway track on the basis of the history of transition of the position information, the behavior pattern recognition unit 190 can determine that the user 3 is on a train during the relevant time. Further, in the case where the user 3 stays in a predetermined building from 9 o'clock to 17 o'clock, the behavior pattern recognition unit 190 can determine that the user 3 is doing work.

Moreover, the behavior pattern recognition unit 190 accumulates the above-mentioned history of transition of the position information of the user 3 for a predetermined time period (for example, one month or the like), to thereby be able to recognize more accurately the behavior pattern of the user 3 on the basis of regularity of the transition of the position information of the user 3.

For example, in the case where the user 3 stays in a predetermined building during the daytime of a weekday, the behavior pattern recognition unit 190 can determine that the user 3 is doing work during the relevant time. Further, in the case where the user 3 stays in a predetermined building during many weekends, the behavior pattern recognition unit 190 can determine that the user 3 is staying at home during the relevant time. Further, in the case where the user 3 stays in a predetermined building from late at night till early morning of weekends and weekdays, the behavior pattern recognition unit 190 can determine that the user 3 is sleeping during the relevant time. Moreover, in the case where the user 3 is in a building such as a department store during the daytime of one weekend, the behavior pattern recognition unit 190 can determine that the user 3 is doing the shopping during the relevant time.

According to the above, the behavior pattern recognition unit 190 can recognize the behavior pattern of the user 3 by accumulating the history of the position information of the user 3 as a life log. Note that, as a method of recognizing the behavior pattern of the user 3 and the behavior pattern to be recognized, the technology disclosed in JP 2011-81431A can also be used, for example.

The behavior recognition unit 110B recognizes the behavior of the user 3 on the basis of: the sensing information of at least one of the user 3 and the environment measured by the sensor unit 100; and the behavior pattern of the user 3 recognized by the behavior pattern recognition unit 190.

For example, in the case where behavior recognition unit 110B cannot recognize the behavior of the user 3 on the basis of the sensing information of at least one of the user 3 and the environment, the behavior recognition unit 110B may recognize, as the behavior of the user 3, the behavior that is determined to be most appropriate at the current time and the current position on the basis of the behavior pattern of the user 3. Further, the behavior recognition unit 110B may exclude behavior or activities that can be excluded at the current time and the current position on the basis of the behavior pattern of the user 3 in advance, and then may recognize the behavior of the user 3 on the basis of the sensing information of at least one of the user 3 and the environment.

Therefore, the behavior recognition unit 110B can recognize the behavior of the user 3 with higher accuracy and granularity further on the basis of the behavior pattern of the user 3 recognized in accordance with the history of position information of the user 3.

In this manner, the information processing apparatus 1B according to the present embodiment can recognize the behavior of the user 3 with higher accuracy and granularity by further using the behavior pattern of the user 3 recognized in accordance with the position information of the user 3. Therefore, the information processing apparatus 1B according to the present embodiment can perform appropriate signal processing on at least one of the audio signal, the noise reduction signal, and the external sound monitor signal.

4. Conclusion

As described above, the information processing apparatus 1 according to the first embodiment of the present disclosure recognizes the behavior of the user 3 on the basis of the sensing information of at least one of the user 3 and the environment, and can perform appropriate signal processing on at least one of the audio signal, the noise reduction signal, and the external sound monitor signal, depending on the recognized behavior.

Further, the information processing apparatus 1A according to the second embodiment of the present disclosure can recognize the behavior of the user with higher accuracy by performing the recognition further on the basis of the result obtained by analyzing the external sound, in addition to the sensing information of at least one of the user 3 and the environment. Accordingly, the information processing apparatus 1A can perform appropriate signal processing on at least one of the audio signal, the noise reduction signal, and the external sound monitor signal.

Moreover, the information processing apparatus 1B according to the third embodiment of the present disclosure can recognize the behavior of the user with higher accuracy and granularity by performing the recognition further on the basis of the behavior pattern of the user 3 recognized in accordance with the history of position information, in addition to the sensing information of at least one of the user 3 and the environment. Accordingly, the information processing apparatus 1B can perform appropriate signal processing on at least one of the audio signal, the noise reduction signal, and the external sound monitor signal.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiments, the information processing apparatuses according to the respective embodiments of the present disclosure have been described each using a portable audio player as an example; however, the present technology is not limited to such an example. For example, the information processing apparatuses according to the respective embodiments of the present disclosure may each be a smartphone, a wearable terminal, an acoustic device such as a headset or a pair of earphones, and an information processing server on a network.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus, including:

a behavior recognition unit configured to recognize behavior of a user on a basis of sensing information of at least one of the user and an environment;

a processing controller configured to control, on a basis of the recognized behavior of the user, signal processing with respect to at least one of an audio signal listened to by the user, a noise reduction signal, and an external sound monitor signal; and a signal processing unit configured to execute the signal processing.

(2)

The information processing apparatus according to (1), in which the external sound monitor signal is a signal including a collected external sound, and the signal processing unit generates the external sound monitor signal.

(3)

The information processing apparatus according to (1) or (2), in which the noise reduction signal is a signal that reduces noise included in a collected external sound, and the signal processing unit generates the noise reduction signal.

(4)

The information processing apparatus according to any one of (1) to (3), in which the processing controller controls acoustic processing to be performed on the audio signal.

(5)

The information processing apparatus according to any one of (1) to (4), in which the processing controller controls amplification processing on the audio signal.

(6)

The information processing apparatus according to any one of (1) to (5), in which the behavior recognition unit recognizes the behavior of the user using a machine learning algorithm that uses the sensing information.

(7)

The information processing apparatus according to any one of (1) to (6), in which the behavior recognition unit recognizes the behavior of the user further on a basis of an external sound.

(8)

The information processing apparatus according to any one of (1) to (7), further including a behavior pattern recognition unit configured to recognize behavior pattern of the user on a basis of position information of the user, in which the processing controller controls the signal processing further on a basis of the recognized behavior pattern of the user.

(9)

The information processing apparatus according to (2), in which, in a case where the behavior recognition unit recognizes that the user is walking, the processing controller controls generation of the external sound monitor signal in which strength of a low frequency band of a collected external sound is reduced.

(10)

The information processing apparatus according to any one of (1) to (10), in which, in a case where the behavior recognition unit recognizes that the user is moving, the processing controller controls generation of the noise reduction signal on a basis of movement speed of the user.

(11)

The information processing apparatus according to (10), in which the processing controller controls, on the basis of the movement speed of the user, at least one of a frequency band and strength of noise reduced using the noise reduction signal.

(12)

The information processing apparatus according to any one of (1) to (11), in which control performed by the processing controller is settable by the user.

(13)

An information processing method, including:

recognizing behavior of a user on a basis of sensing information of at least one of the user and an environment;

controlling, by an arithmetic processing unit, on a basis of the recognized behavior of the user, signal processing with respect to at least one of an audio signal listened to by the user, a noise reduction signal, and an external sound monitor signal; and executing the signal processing.

(14)

A program for causing a computer to function as a behavior recognition unit configured to recognize behavior of a user on a basis of sensing information of at least one of the user and an environment, a processing controller configured to control, on a basis of the recognized behavior of the user, signal processing with respect to at least one of an audio signal listened to by the user, a noise reduction signal, and an external sound monitor signal, and a signal processing unit configured to execute the signal processing.

REFERENCE SIGNS LIST 1 information processing apparatus
2 acoustic device
3 user
100 sensor unit
110 behavior recognition unit
120 processing controller
130 content storage
140 microphone unit
150 signal processing unit
160 output unit
170 analysis unit
180 position information acquisition unit
190 behavior pattern recognition unit

What is claimed is:

1. An information processing apparatus, comprising:
   one or more sensors configured to measure sensing information of a user and ambient noise of an environment;
   a processor configured to perform instructions to:
   use a machine learning algorithm to process the sensing information and the ambient noise to determine a behavior of the user, wherein the machine learning algorithm uses a history of position information of the user to detect at least one pattern of the user;
   control on a basis of the determined behavior of the user, signal processing with respect to an audio signal listened to by the user and an external sound monitor signal, wherein the external sound monitor signal includes a collected external sound;
   execute the signal processing on the audio signal listened; and
   output the audio signal to at least one speaker.

2. The information processing apparatus according to claim 1, further comprising:
   the processor is configured to perform instructions to: generate a noise reduction signal.

3. The information processing apparatus according to claim 2, wherein
   the noise reduction signal is a signal that reduces noise included in the collected external sound.

4. The information processing apparatus according to claim 1, wherein the processor is configured to perform instructions to: control acoustic processing to be performed on the audio signal.

5. The information processing apparatus according to claim 1, wherein the processor is configured to perform instructions to: control amplification processing on the audio signal.

6. The information processing apparatus according to claim 1, wherein the signal processing with respect to the external sound monitor signal allows the user to hear at least a portion of the collected external sound.

7. The information processing apparatus according to claim 1, further comprising:
   a content storage system configured to store the sensing information.

8. The information processing apparatus according to claim 1, wherein the behavior comprises walking, and the processor is configured to perform instructions to:
   control generation of the external sound monitor signal in which strength of a low frequency band of the collected external sound is reduced.

9. The information processing apparatus according to claim 2, wherein the behavior comprises movement, and the processor is configured to perform instructions to:
   control generation of the noise reduction signal on a basis of movement speed of the user.

10. The information processing apparatus according to claim 9, wherein the processor is configured to perform instructions to: control, on the basis of the movement speed of the user, at least one of a frequency band and strength of noise reduced using the noise reduction signal.

11. The information processing apparatus according to claim 1, wherein the control performed on the basis of the determined behavior of the user is settable by the user.

12. The information processing apparatus according to claim 1, wherein the processor is configured to perform instructions to:
   further determine the behavior of the user based on a current time and/or a current position of the user.

13. An information processing method, comprising:
   recognizing a behavior of a user on a basis of sensing information of the user and ambient noise of an environment;
   using a machine learning algorithm to process the sensing information, wherein the machine learning algorithm uses a history of position information of the user to detect at least one pattern of the user:
   controlling on a basis of the recognized behavior of the user, signal processing with respect to an audio signal listened to by the user and an external sound monitor signal, wherein the external monitor signal includes a collected external sound;
   executing the signal processing on the audio signal; and
   outputting the audio signal.

14. The information processing method of claim 13, wherein the behavior of the user is further determined based on a current time and/or a current position of the user.

15. A computing apparatus comprising:
   one or more computer readable storage media;
   a processing system operatively coupled with the one or more computer readable storage media; and
   program instructions stored on the one or more computer readable storage media that when read and executed by the processing system, direct the processing system to at least:
   recognize a behavior of a user on a basis of sensing information of the user and ambient noise of an environment;
   use a machine learning algorithm to process the sensing information, wherein the machine learning algorithm uses a history of position information of the user to detect at least one pattern of the user;
   control on a basis of the recognized behavior of the user, signal processing with respect to an audio signal listened to by the user and an external sound monitor signal, wherein the external monitor signal includes a collected external sound;
   execute the signal processing; and
   output the audio signal.

16. The computing apparatus of claim 15, further comprising the program instructions that when read and executed by the processing system, direct the processing system to at least:
   further determine the behavior of the user based on a current time and/or a current position of the user.

* * * * *